United States Patent
Gresset et al.

(10) Patent No.: US 8,054,870 B2
(45) Date of Patent: Nov. 8, 2011

(54) SYSTEM FOR TRANSMITTING INFORMATION DATA FROM A TRANSMITTER TO A RECEIVER OVER A NESTED BLOCK CHANNEL

(75) Inventors: Nicolas Gresset, Rennes Cedex (FR);
Kraidy Ghassan, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 579 days.

(21) Appl. No.: 12/190,259

(22) Filed: Aug. 12, 2008

(65) Prior Publication Data

US 2009/0060012 A1    Mar. 5, 2009

(30) Foreign Application Priority Data

Sep. 2, 2007 (EP) .................................. 07017184

(51) Int. Cl.
*H04B 1/38* (2006.01)
(52) U.S. Cl. ...................................................... 375/219
(58) Field of Classification Search .................. 375/260, 375/262, 267, 295, 299, 316, 340–341, 346; 455/101, 103
See application file for complete search history.

(56) References Cited

U.S. PATENT DOCUMENTS

| | | | | |
|---|---|---|---|---|
| 6,560,295 B1 * | 5/2003 | Hammons et al. | ............ | 375/299 |
| 2003/0131303 A1 * | 7/2003 | Kim et al. | .................... | 714/755 |
| 2009/0268839 A1 * | 10/2009 | Gresset | ......................... | 375/267 |
| 2010/0195563 A1 * | 8/2010 | Jong et al. | .................... | 370/321 |

OTHER PUBLICATIONS

U.S. Appl. No. 12/400,351, filed Mar. 9, 2009, Gresset.
Genyuan Wang, et al., "Nested Cooperative Encoding Protocol for Wireless Networks with High Energy Efficiency", 2005 IEEE 6$^{th}$ Workshop on Signal Processing Advances in Wireless Communications,Jun. 8, 2005, XP010834635, pp. 821-825.
Aria Nosratinia, et al., "Cooperative Communication in Wireless Networks", Adaptive Antennas and MIMO Systems for Wireless Communications, vol. 42, No. 10, Oct. 2004, XP001210053, pp. 74-80.
Piyush Gupta, et al., "Towards an Information Theory of Large Networks: An Achievable Rate Region", IEEE Transactions on Information Theory, vol. 49, No. 8, Aug. 2003, XP011098653, pp. 1877-1894.
Zixiang Xiong, et al, "Source-Channel Coding for Algegraic Multiterminal Binning", Information Theory Workshop, Oct. 24, 2004, XP010776159, pp. 318-323.

* cited by examiner

*Primary Examiner* — Khanh C Tran
(74) *Attorney, Agent, or Firm* — Oblon, Spivak, McClelland, Maier & Neustadt, L.L.P.

(57) ABSTRACT

The present invention concerns a system for transmitting information data from a transmitter to a receiver over nested block channel, the transmitter (TRD) comprising an encoder (ENC) following an error correcting code structure, the receiver (RCV) comprising a decoder (DEC) defined according to the error correcting code structure, the nested block channel (NBCH) comprising a scaled BPSK binary modulator (BM), the amplitude of which may vary from one bit transmission to the other. Such system is characterized in that the coding rate (Rc) of the encoder (ENC) or the parameters (D,L) of the nested block channel (NBCH) are selected dependently one from each other to achieve a target diversity order of the system and to maximize the coding gain.

24 Claims, 1 Drawing Sheet

SYSTEM FOR TRANSMITTING INFORMATION DATA FROM A TRANSMITTER TO A RECEIVER OVER A NESTED BLOCK CHANNEL

CROSS-REFERENCE TO RELATED APPLICATIONS

This application claims priority under 35 U.S.C. 119 to European Patent Application No. 07 017184.8 filed Sep. 2, 2007, the entire content of which is incorporated herein by reference.

FIELD OF THE INVENTION

The present invention relates to a system for transmitting information data from a transmitter to a receiver over a nested block channel. The present invention concerns also a transmitter of such a system.

BRIEF DISCUSSION OF THE BACKGROUND

In the following, a channel resource means a frequency bandwith, a time interval and possibly several spatial dimensions brought by transmit and receive antennas placed in different spatial positions.

Signals transmitted over wireless channels undergo severe degradations due to channel variations such as fading, shadowing, and interference from other transmitters, which allows considering the channel as a random variable. In the following, are considered slow channel variations with respect to the time needed for transmission of the information words, but the channel realization is supposed to have changed between two transmissions of information words. One major way to combat the so-called quasi-static fading is to provide diversity in either time, frequency, or space.

The channel diversity order is defined as the number of independent fading random variables observed in the channel resource. The transmission/reception scheme is able to collect a given amount of diversity, called diversity order of the system, upper bounded by the channel diversity order, also called full diversity order.

When an information word is not correctly estimated by the receiver, an error event occurs. The main parameter allowing to compute the probability of error associated to a given error event is the Euclidean distance between the noiseless received signal associated to the transmitted information word and the reconstructed noiseless received signal associated to the decoded information word. The diversity order of the error event is defined as the number of independent random variables involved in the Euclidean distance associated to the error event. Finally, the system diversity order is equal to the minimal diversity order of all possible error events or equivalently all possible pairs of information words.

Multiple-antenna systems that provide high orders of spatial diversity and high capacity have been extensively studied. However, due to the expensive analog Radio-Frequency components, the number of antennas in mobile terminals is often limited to one transmission Radio-Frequency path and two reception Radio-Frequency paths. Such mobile terminals do not allow transmitted signals to attain high diversity orders over narrow band channels, such as OFDM-based (Orthogonal Frequency-Division Multiplexing) transmission systems.

The concept of 'cooperative communications' has then been introduced where multiple terminals use the capabilities of each other. This allows the signals to attain high diversity orders, being transmitted by other terminals leading in that way to a virtual antenna array as proposed by Sendonaris et al. in the article 'User cooperation diversity. Part 1. system description', IEEE Transactions on Communications, vol. 51, no. 11, pp. 1927-1938, November 2003'. In the following, we describe the idea of cooperative transmission protocols, which is an application of the invention described hereafter.

One potential application of such systems is in wireless ad-hoc networks, such as mesh networks for instance, which does not depend on a central control unit and does not have a fixed infrastructure. The nodes communicate by forming a network based on channel conditions and mobile locations.

Another application of such systems is the cooperation of in-cell users in a cellular system. Reliable communication can be achieved through diversity and by relaying signals from terminals that are far from the base station. The advantage of such systems compared to traditional ones is that the more users there are in a network, the more reliably one can communicate. This is the result of the non-rigidity of the infrastructure of cooperative systems. In the opposite, the rigidity of the infrastructure of non-cooperative systems involves an increase of blocking probability with the number of terminals that are sharing the network.

The drawback of cooperative systems is that the inter-user channel is noisy. In order to counterfeit this drawback, multiple cooperation protocols have been developed and define the way the cooperation between users is performed.

Cooperation protocols can be classified into two major categories: Amplify-and-Forward (AF) and decode-and-forward (DF). We focus in the following on the AF protocols.

Using the AF protocol, a relay, which is for example an user mobile radio equipment or an equipment used for extending the range of a cell, only amplifies the signal received from a source (a base station or another relay) before forwarding it to a destination (a base station or another relay). These protocols are easy to implement in practice, as the computational complexity they introduce at the relays is limited to a scaling operation.

Multiple AF protocols have been designed for the single-relay case such as, for example, the non-orthogonal amplify-and-forward (NAF) protocol, also known as the TDMA-based Protocol I, in which the source broadcasts a signal to both the relay and the destination in the first phase. In the second phase, the relay scales the signal and forwards it to the destination, while the source transmits another message to the destination (Nabar et al., "Fading relay channel: performance limits and space-time signal design', IEEE Journal on Selected Areas in Communications, vol. 22, no. 6, pp. 1099-1109, August 2004).

In the following, we focus on the case where multiple relays are used by the transmission system. The selected transmission protocol transmits a signal over each time slot of a set of predetermined set of M time slots.

For example, the well-known Slotted Amplify-and-Forward (SAF) protocol may be used. However, the invention is not limited to the transmission over a half-duplex non-orthogonal Amplify-and-Forward cooperative channel.

BRIEF SUMMARY OF THE INVENTION

FIG. 1 is a schematic diagram depicting a transmission system according to the present invention. The system SYST comprises a transmitter TRD, a receiver RCV, and a nested block channel NBCH. The transmitter TRD is for example a mobile user equipment, the receiver RCV is for example a base station.

The transmitter TRD comprises an encoder ENC following an error correcting code structure. Roughly speaking, the digital transmission is made as follows: Information data bits {b} to transmit fed the encoder ENC with a Rate Rc=K/N, K is the number of input data bits {b} and N is the number of bits of the output codewords {c}. The encoder ENC may follow any type of error correcting code structure such as, for example, the LDPC (Low Density Parity Check) codes, turbo-codes, block-codes (Reed-Solomon for example), binary convolutional codes, etc. The coded bits are then transmitted over the nested block channel NBCH which comprises a binary modulator BM and a block channel BCH.

The binary modulator BM applies a scaled BPSK modulation, i.e., the '0' bit value and '1' bits value are respectively associated to two opposite values (e.g., A and −A). Moreover, the corresponding Euclidean distance 2A can change from the transmission of one bit to the other.

The block channel BCH is defined as follows in relation with FIG. 2. Let us consider $\lambda$ independent fading distributions $\{a_1, \ldots a_\lambda\}$. Let M(D,L) be the mathematical model of the nested block channel NBCH built from the concatenation of |D| blocks, where D={D(1), ..., D(k), ..., D(|D|)} and are the sets of diversity orders and lengths of each block respectively. The sets D and L are the parameters of the nested block channel. The integer value |D| is the cardinality of the set D. The fading random variable associated to the i-th block is defined by a combination of a subset S(i) of D(i) random variables with the integer value D(i)≦$\lambda$ such that S(i+1)⊂S(i), which means $\forall i<j$, D(i)≧D(j) and assuming that D(1)=$\lambda$ has the highest diversity order.

As usual, the concatenation of several digital or analog transmission blocks, the propagation channel and several digital or analog reception blocks define an equivalent channel. A system which equivalent channel follows the nested block channel model, input of which is the output of an encoder and output of which is the input of a decoder, falls under the scope of the invention.

The receiver RCV comprises the decoder DEC, converting received versions {ĉ} of coded bits {c} into estimates {b̂} of information data bits {b}.

A variant of the transmission system is to interleave the coded bits using a bit interleaver INT and to apply at the receiver side the associated bit de-interleaving using a bit de-interleaver DINT, as illustrated in FIG. 1.

For quasi-static channels, the first criterion to be optimised is the system diversity order. For a given system diversity order, the coding gain is the second criterion to be optimised, it depends on the error correcting code structure and on the scaled BPSK binary modulation Euclidean distances.

The problem solved by the invention is to optimise the transmission system SYST in order to simultaneously reach a target diversity order of such a system and maximize the coding gain.

Indeed, according to the invention, a system for transmitting information data from a transmitter to a receiver over nested block channel, the transmitter comprising an encoder following an error correcting code structure, the receiver comprising a decoder defined according to the error correcting code structure, the nested block channel comprising a scaled BPSK binary modulator, the amplitude of which may vary from one bit transmission to the other, is characterized in that the coding rate of the encoder or the parameters of the nested block channel are selected dependently one from each other to achieve a target diversity order of the system and to maximize the coding gain.

A mathematical model of the nested block channel consisting in a concatenation of blocks, said nested block channel having two parameters which are a set of diversity orders D={D(1), ..., D(k), ..., D(|D|)} and a set of lengths of blocks L={L(1), ..., L(k), ..., L(|D|)}, where |D| is the cardinality of the set of diversity orders D, the number of concatenated blocks being equals to |D|, the fading random variable associated to the i-th block being defined by a combination of a subset S(i) of D(i) random variables with the integer value D(i)≦$\lambda$ where $\lambda$ is an integer number of independent fading distributions, such that S(i+1)⊂S(i), which means $\forall i<j$, D(i)≧D(j) and assuming that D(1)=$\lambda$ has the highest diversity order, the system is characterised in that the coding rate of the encoder, the two parameters of the nested block channel and the achievable target diversity order $\delta$ of the system are linked by the relationship $$\delta = D(i) \text{ where } i \text{ is given by } \sum_{k=1}^{i-1} L(k) < Rc \sum_{k=1}^{|D|} L(k) \leq \sum_{k=1}^{i} L(k)$$

According to an embodiment of the nested block channel, the nested block channel comprising a binary modulator the output of which are vectors of modulation symbols, a linear combiner, a Sliding Triangular channel, described hereafter, and a detector, is characterised in that the modulation symbols of a same vector of modulation symbols are combined together thanks to the linear combiner which provides an output vector of M combined symbols.

A full linear combiner is defined as follows: Each output symbol is a linear combination of all the input symbols. Identity linear combiner is defined as follows: the output vector of symbols is equal to the input vector of symbols. A partial linear combiner is a linear combiner which is neither a full linear combiner nor identity linear combiner.

According to an embodiment of the linear combiner, the system is characterised in that the first combined symbols and last s−1 combined symbols of said vector of M combined symbols are linear combinations of the first s modulation symbols and each of the other combined symbols is equal to one of the last M-s modulation symbols. The parameter s of the linear combiner is called the partial combining size of the linear combiner.

According to this embodiment of the system, the equivalent nested block channel has parameters D={M,M−1 ..., s} and L={sN/M,N/M, ..., N/M}, the system is characterised in that the coding rate of the encoder, the number M of time slots of the Sliding Triangular channel and the partial combining size s of the linear combiner and the achievable target diversity order $\delta$ are selected dependently one from each other thanks to the following relationship:

$\delta = \min(s + \lfloor(1-Rc)M\rfloor, M)$

According to another embodiment of the system, the partial combining size s of the linear combiner is chosen according to the target diversity order $\delta$, the rate Rc of the encoder and the number M of time slots of the Sliding Triangular (ST) channel:

$$s = \arg\min_{s'}\{\delta = \min(s' + \lfloor(1 - Rc)M\rfloor, M)\}$$

According to another embodiment of the linear combiner, the number of time slots of the transmission over the Sliding Triangular channel is a multiple of the parameter the partial linear combining size s of the linear combiner, the linear combiner is characterised in that the first combined symbols and last s−1 symbols are linear combinations of the first s modulation symbols, the second combined symbol and last s−1 non-already considered combined symbols are linear combinations of the following and non already considered modulation symbols, and so on. The parameter s of the linear combiner is called the partial combining size of the linear combiner.

According to this embodiment of the system, the equivalent nested block channel has parameters D={M,M−1 ..., M+1−M/s} and L={sN/M, ..., sN/M}, characterised in that the coding rate of the encoder, the number M of time slots of the Sliding Triangular channel and the partial combining size s of the linear combiner and the achievable target diversity order δ are selected dependently one from each other thanks to the following relationship:

$$\delta = \min\left(\frac{M(s-1)}{s} + 1 + \left\lfloor\frac{(1-Rc)M}{s}\right\rfloor, M\right)$$

According to another embodiment of the system, the partial combining size s of the linear combiner is chosen according to the target diversity order δ, the rate Rc of the encoder and the number M of time slots of the Sliding Triangular channel, thanks to the following relationship:

$$s = \arg\min_{s'}\left\{\delta = \min\left(\frac{M(s'-1)}{s'} + 1 + \left\lfloor\frac{(1-Rc)M}{s'}\right\rfloor, M\right)\right\}$$

According to an embodiment of the detector, the detector performs an exhaustive marginalization in order to get estimates of the coded data bits, or an interleaved version of such coded bits according to the variant of the system, under the form of Log Likelihood Ratio.

According to an embodiment of the Sliding Triangular channel, the Sliding Triangular channel is defined by a Slotted Amplify-and-Forward protocol using β relays, one use of said Sliding Triangular channel including (β+1) time slots of the Slotted Amplify-and-Forward protocol and the size of the linear combining matrix M equals β+1.

According to an embodiment of the system, the transmitter comprises a bit interleaver and the receiver comprises a de-interleaver, the bit interleaver is designed according to the error correcting code structure in order to ensure that the performance at the output of the associated decoder exhibits the achievable target diversity order.

According to another embodiment of the system, the error correcting code is systematic and the bit interleaver places the systematic bits on the blocks of highest diversity order of the equivalent nested block channel.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

According to the present invention, the transmission system SYST described in the opening paragraph, is characterised in that the achievable target diversity order δ of the system SYST are linked by the relationship $$\delta = D(i) \text{ where } i \text{ is given by } \sum_{k=1}^{i-1}L(k) < Rc\sum_{k=1}^{|D|}L(k) \leq \sum_{k=1}^{i}L(k)$$

Figure 1:
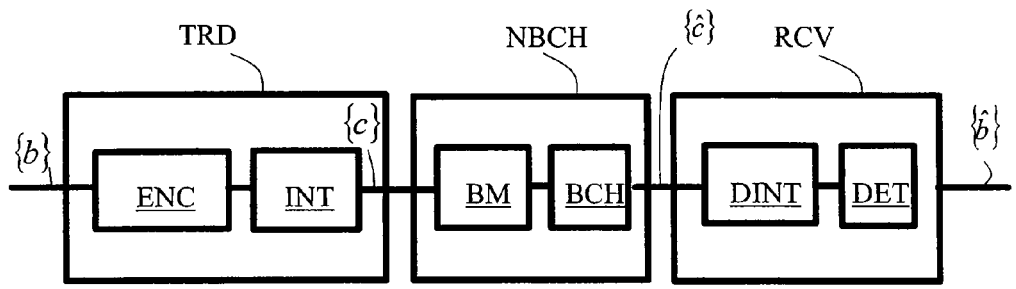
FIG. 1 which represents a schema of a transmission system according to the present invention, FIG. 2 which represents a schema of a block channel BCH, FIG. 3 which represents a schema of an embodiment of the nested block channel NBCH according to the invention, and FIG. 4 which represents the inter-relay communications protocol of the SAF channel model
Figure 2:
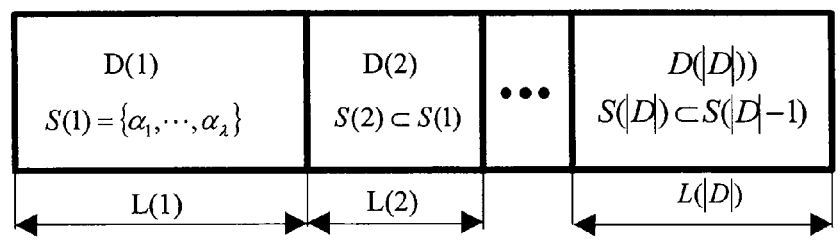
Figure 3:
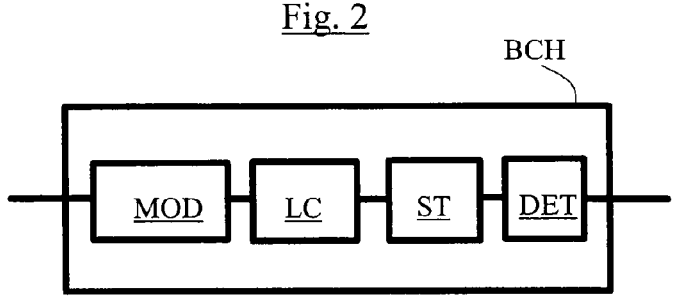

FIG. 3 illustrates an embodiment of the nested block channel NBCH according to the invention. The nested block channel NBCH comprises a binary modulator MOD, a linear combiner LC, a Sliding Triangular channel ST and a detector DET.

The binary modulator MOD is a BPSK (Binary Phase Shift Keying) or QPSK (Quadrature Phase Shift Keying) modulation for example and preferably a M-Quadrature Amplitude Modulation (M-QAM). The inputs of the binary modulator MOD are coded bits {c} or an interleaved version {c} of such coded bits according to the variant of the system, and the outputs are a vector of modulation symbols zi. The vector of symbols zi is split in at least one vector Z of M-length symbols zi. The symbols zi of a same vector Z are then combined together thanks to the linear combiner LC which provides an output vector X of M combined symbols xi.

Mathematically speaking, the vector X is obtained by the multiplication of the vector Z and a M×M complex matrix S.

The vectors of symbols X are then transmitted through the Sliding-Triangular channel ST described hereafter. In matrix form, the signal model is given by:

$$Y_d = X*H + W_c = Z*S*H + W_c$$

where $Y_d$ is the M-length vector of received signals and Z is a M-length vector, Wc is an additive noise M-length vector, and H is an upper-triangular matrix defining the Block channel BCH given by:

$$H = \begin{bmatrix} a_1 & a_2 & a_3 & a_4 & \cdots & a_M \\ 0 & a_1 & a_3 & \vdots & & \vdots \\ \vdots & \ddots & a_1 & a_4 & & \vdots \\ \vdots & & \ddots & a_1 & \ddots & \vdots \\ \vdots & & & \ddots & a_1 & a_M \\ 0 & \cdots & \cdots & \cdots & 0 & a_1 \end{bmatrix} \otimes \begin{bmatrix} \gamma_{1,1} & \gamma_{1,2} & \cdots & \cdots & \cdots & \gamma_{1,M} \\ 0 & \gamma_{2,2} & & & & \vdots \\ \vdots & \ddots & \ddots & & & \vdots \\ \vdots & & \ddots & \ddots & & \vdots \\ \vdots & & & & \ddots & \vdots \\ 0 & \cdots & \cdots & \cdots & 0 & \gamma_{M,M} \end{bmatrix}$$

where $\otimes$ denotes the term by term product, $a_1, a_2, \ldots, a_M$ are the fading random variable coefficients establishing the diversity properties of the channel. The $\gamma_{1,1}$ values are random variables or fixed parameters. A channel is equivalent to a ST channel as soon as it has the same configuration of fading coefficients.

Note that the modulation symbols zi may be perturbed by other channel imperfections than the ones associated to the ai random variables, for example, additive noise, other multiplicative random variables. The important statement is that the set of random variables producing the diversity order associated to zi is the same set of random variables than the one associated to the transmission of z(i−1) plus one random variable bringing an additional order of diversity.

According to an embodiment of the detector DET, optimal detection of the signal $Y_d$, is reached by performing an exhaustive marginalization at the detector DET which produces estimates on the coded bits under the form of Log Likelihood Ratio (LLR).

From the LLR values, the coded bits then appears to have been modulated by a scaled BPSK modulation and transmitted over a block channel as described in the nested block channel NBCH. The four steps modulation, linear combining, transmission though the Sliding triangular channel and detection are then equivalent to a nested block channel NBCH. The parameters L and D of the equivalent nested block channel NBCH are deduced from the number M of time slots, the number s of modulation symbols zi combined together by the linear combiner LC and the number N of coded bits to be transmitted.

According to an embodiment of the linear combiner LC, the linear combiner LC is defined as follows: the first symbols x1 of vector X and last (s−1) symbols x(M+2−s), ..., x(M), are linear combinations of the first s symbols zl, ..., zs. The other M−s symbols remain unchanged, i.e., x(1+i)=z(s+i). The parameter s of the linear combiner is called the partial combining size of the linear combiner. If $I \leq s \leq M$, the linear combiner is a partial linear combiner. The linear combiner is mathematically equivalent to the following matrix structure:

$$S = \begin{bmatrix} S_{1,1} & 0 & \cdots & 0 & S_{1,M+2-s} & \cdots & S_{1,M} \\ \vdots & \vdots & \ddots & \vdots & \vdots & \ddots & \vdots \\ S_{s,1} & 0 & \cdots & 0 & S_{s,M+2-s} & \cdots & S_{s,M} \\ 0 & 1 & 0 & \cdots & & \cdots & 0 \\ \vdots & \ddots & \ddots & \ddots & & & \vdots \\ 0 & \cdots & 0 & 1 & 0 & \cdots & 0 \end{bmatrix}$$

According to this embodiment of the linear combiner LC, the equivalent nested block channel NBCH has parameters D={M,M−1 ..., s} and L={sN/M,N/M, ..., N/M}.

The coding rate Rc of the encoder ENC or the parameters D and L of the nested block channel NBCH are selected dependently one from each other to achieve a target diversity order of the system SYST and to maximize the coding gain thanks to the following relationship $$\delta = \min(s + \lfloor (1-Rc)M \rfloor, M)$$

For fixed parameters M and Rc, and for high spectral efficiency modulations (e.g., 16-QAM), several values of s may lead to the same target diversity δ. The coding gain is maximized if s is minimized which justifies that the selected parameter s of the linear combining LC is $$s = \arg\min_{s'} \{\delta = \min(s' + \lfloor (1 - Rc)M \rfloor, M)\}$$

According to a second embodiment of the linear combiner LC, the parameter s divides the parameter M, and the linear combination is defined as follows: the first symbols x1 and last (s−1) symbols x(M+2−s), ..., x(M) are linear combinations of the first symbols zl, ..., zs. The second symbol x2 and last (s−1) non-already selected symbols x(M+3−2s), ..., x(M+1−s) are linear combinations of the symbols z(s+1), ..., z(2s), and so on .... If $1 \leq s \leq M$, the linear combiner LC is a partial linear combiner.

According to this embodiment, the equivalent nested block channel has parameters D={M,M−1 ..., M+1−M/s} and L={sN/M, ..., sN/M}.

The coding rate Rc or the parameters D and L of the nested block channel NBCH are selected dependently one from each other to achieve a target diversity order of the system and maximize the coding gain thanks to the following relationship $$\delta = \min\left(\frac{M(s-1)}{s} + 1 + \left\lfloor \frac{(1-Rc)M}{s} \right\rfloor, M\right)$$

For fixed parameters M and Rc, and for high spectral efficiency modulations (e.g., 16-QAM), several values of s may lead to the same target diversity $\delta = \min(s + \lfloor (1-Rc)M \rfloor, M)$. The coding gain is maximized if s is minimized which justifies that the selected parameter s of the linear combining LC is $$s = \arg\min_{s'}\left\{\delta = \min\left(\frac{M(s'-1)}{s'} + 1 + \left\lfloor \frac{(1-Rc)M}{s'} \right\rfloor, M\right)\right\}$$

According to an embodiment of the ST channel, the ST channel is defined by a SAF protocol for cooperative transmissions with several relays.

Figure 4:
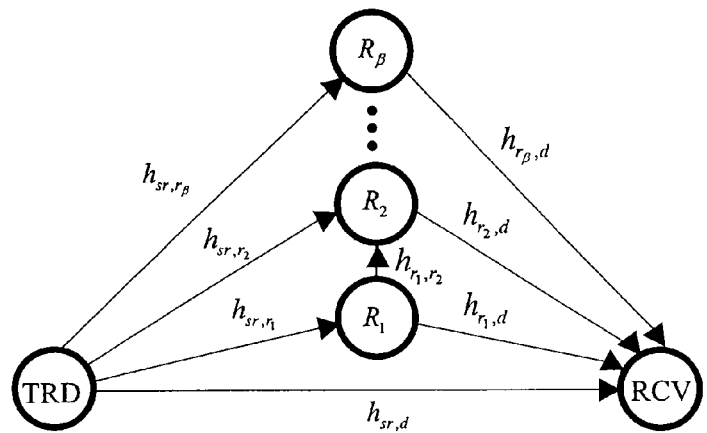

FIG. 4 represents the inter-relay communications protocol of the SAF channel model. Note that in practice, noisy and attenuated versions of combined symbols xi are received at the relays and receiver.

According to this example, β relays are used and this involves that one use of the channel ST includes (β+1) time slots Tsi of the SAF protocol, and the size of the linear combining matrix is chosen such that M=β+1.

During the first time slot TS1 of the SAF protocol, the transmitter TRD transmits the first symbol x1, which is received by a first relay R1 and by the receiver RCV. During the second time slot TS2 of the general SAF protocol, the transmitter TRD transmits the second symbol x2 and the relay R1 transmits the previously received version of the symbol x1, which are received by the receiver RCV and a second relay R2.

During the third time slot TS3 of the general SAF protocol, the transmitter TRD transmits the third symbol x3 and the relay R2 transmits the previously received and combined versions of the symbols x1 and x2, which are received by the receiver RCV and a third relay R3.

During the last time slot TS(β+1) of the general SAF protocol, the transmitter TRD transmits the last symbol x(β+1) and the last relay R β transmits the previously received and combined versions of the symbols x1, ..., xβ, which are received by the receiver.

By consequence, a version of the first symbol x1 is transmitted during each of the (β+1) time slots of one channel use. A version of the i-th symbol xi is transmitted during the last (β+1)−i+1 time slots and versions of the last symbol x(β+1) is received by the received RCV only during the last time slot of the SAF protocol.

The relay R1 receives a version of the first symbol x1 during the first time slot TS1 and re-transmits it during the second time slot TS2. The i-th relay Ri receives a combination of the versions of the first i symbols xi during the i-th time slot, and re-transmits it during the i+1-th time slot (the i-th relay receives the signal transmitted by the transmitter and the i−1-th relay).

Consequently, the first symbol x1 carries coded data bits, estimation of which have a diversity order D(β+1) as perceived by the decoder DEC, the i-th symbol xi carries coded data bits, estimation of which have a diversity order D(β+2−i) as perceived by the decoder DEC, and the last symbol x(β+1) carries coded data bits, estimation of which have a diversity order D(1) as perceived by the decoder DEC.

The receiver RCV receives a version of the first symbol x1 during the first time slot TS1, a combination of versions of the first i symbols xi during the time slot Tsi and a combination of versions of all the (β+1) symbols xi during the last time slot.

Mathematically speaking, the signal model transmitted between the transmitter TRD and the receiver RCV when β relays Ri are considered is given by:

$$y_{d_i} = \sqrt{\epsilon_1}*h_{sr,d}*x_i + \sqrt{1-\epsilon_i}*h_{r_i,d}*\gamma_{i-1}*y_{r_{i-1}} + w_{d_i}$$

$$y_{r_i} = \sqrt{\epsilon_1}*h_{sr,r_i}*x_i + \sqrt{1-\epsilon_1}*h_{r_{i-1},r_i}*\gamma_{i-1}*y_{r_{i-1}} + w_{r_i}$$

with i+1, ..., β+1. Subscripts sr (stands for source), d (stands for destination) and $r_i$ (stands for relay) correspond respectively to the transmitter TRD, the receiver RCV and the i-th relay. The unit variance complex symbol xi is transmitted in the i-th time slot, the received signal at the receiver in the i-th time slot is $y_{d_i}$, while $y_{r_i}$ is the signal received by the i-th relay Ri. The coefficient $\epsilon_i$ represents the energy transmitted by the transmitter TRD in the i-th time slot. The $h_{k,l}$ are the fading coefficients and $w_{d_i}$ and $w_{r_i}$ are AWGN noise components. The $\gamma_i$ are the energy normalization coefficients at the i-th relay Ri, subject to $E|\gamma_1 y_{r_{i-1}}|^2 \leq 1$, and $\gamma_0 = 0$.

From this channel model, we remark that the SAF channel has the same block diversity properties as the ST channels. Moreover, as for the ST channels, the coding gain is maximized if the parameter s of the linear combining LC is minimized.

The invention claimed is:

1. System for transmitting information data from a transmitter to a receiver over nested block channel, the transmitter comprising an encoder following an error correcting code structure, the receiver comprising a decoder defined according to the error correcting code structure, the nested block channel comprising a scaled BPSK binary modulator, the amplitude of which may vary from one bit transmission to the other,
wherein the coding rate (Rc) of the encoder or the parameters (D,L) of the nested block channel made of blocks are selected dependently one from each other to achieve a target diversity order of the system and to maximize the coding gain, and
wherein D represents the diversity orders of each block, and L represents the lengths of each block.

2. System according to claim 1, a mathematical model of the nested block channel consisting in a concatenation of the blocks, said nested block channel having two parameters which are a set of the diversity orders D={D(1), ..., D(k), ..., D(|D|)} and a set of the lengths of blocks L={L(1), ..., L(k), ..., L(|D|)}, where |D| is the cardinality of the set of diversity orders D, the number of concatenated blocks being equal to |D|, the fading random variable associated to the i-th block being defined by a combination of a subset S(i) of D(i) random variables with the integer value D(i)≦λ where λ is an integer number of independent fading distributions, such that S(i+1) ⊂ S(i), which means ∀i<j, D(i)≧D(j) and assuming that D(1)=λ has the highest diversity order,
wherein the coding rate (Rc) of the encoder, the two parameters (D, L) of the nested block channel and the achievable target diversity order δ of the system are linked by the relationship $$\delta = D(i) \text{ where } i \text{ is given by } \sum_{k=1}^{i-1} L(k) < Rc \sum_{k=1}^{|D|} L(k) \leq \sum_{k=1}^{i} L(k).$$

3. System according to claim 2, the nested block channel comprising a binary modulator the output of which are vectors of modulation symbols (zi), a partial linear combiner, a Sliding Triangular channel comprising M time slots and a detector,
wherein the modulation symbols (zi) of a same vector (Z) of modulation symbols are combined together by the linear combiner which provides an output vector (X) of M combined symbols (xi) associated to one transmission over the Sliding Triangular channel.

4. System according to claim 3, wherein in the first combined symbols (x1) and last s−1 combined symbols (x(M+2−s), ..., x(M)) of said vector (X) of M combined symbols (xi) are linear combinations of the first s modulation symbols (zl, ..., zs) and each of the other combined symbols (xi) is equal to one of the last M−s modulation symbols (zi), s being the partial combining size of the linear combiner.

5. System according to claim 4, the equivalent nested block channel having parameters D={M,M−1..., s} and L={sN/M,N/M, ..., N/M},
wherein the coding rate (Rc) of the encoder, the number M of time slots of the Sliding Triangular channel and the partial combining size s of the linear combiner and the achievable target diversity order δ are selected dependently one from each other by the following relationship:

$$\delta = \min(s + \lfloor (1-Rc)M \rfloor, M).$$

6. System according to claim 5, wherein the partial combining size s of the linear combiner is chosen according to the target diversity order δ, the rate Rc of the encoder and the number M of time slots of the Sliding Triangular channel, by the following relationship:

$$s = \arg\min_{s'}\{\delta = \min(s' + \lfloor (1 - Rc)M \rfloor, M)\}.$$

7. System according to claim 3, the number M of time slots of the transmission protocol which define the Sliding Triangular channel is a multiple of the partial linear combining size s of the linear combiner,
wherein the first combined symbols (x1) and last s−1 symbols (x(M+2−s), ..., x(M)) are linear combinations of the first s modulation symbols (zl, ..., zs), the second combined symbol (x2) and last s−1 non-already considered combined symbols (x(M+3−2s), ..., x(M+1−s)) are linear combinations of the s following and non-already considered modulation symbols (z(s+1), ..., z(2s)), and so on.

8. System according to claim 7, the equivalent nested block channel having parameters D={M,M−1 ..., M+1−M/s} and L={sN/M, ..., sN/M}, wherein the coding rate (Rc) of the encoder, the number M of time slots of the Sliding Triangular channel and the partial combining size s of the linear combiner and the achievable target diversity order δ are selected dependently one from each other by the following relationship:

$$\delta = \min\left(\frac{M(s-1)}{s} + 1 + \left\lfloor\frac{(1-Rc)M}{s}\right\rfloor, M\right).$$

9. System according to claim 8, wherein the partial combining size s of the linear combiner is chosen according to the target diversity order δ, the coding rate (Rc) of the encoder and the number M of time slots of the Sliding Triangular channel, by the following relationship:

$$s = \arg\min_{s'}\left\{\delta = \min\left(\frac{M(s'-1)}{s'} + 1 + \left\lfloor\frac{(1-Rc)M}{s'}\right\rfloor, M\right)\right\}.$$

10. System according to claim 3, wherein the detector performs an exhaustive marginalization to get estimates of the coded data bits being version of the information bits encoded through the encoder under the form of Log Likelihood Ratio.

11. System according to claim 3, wherein the Sliding Triangular channel is defined by a Slotted Amplify-and-Forward protocol using β relays, one use of said Sliding Triangular channel including (β+1) time slots of the Slotted Amplify-and-Forward protocol and the size of the linear combining matrix M equals β+1.

12. System according to claim 1, wherein the transmitter comprises a bit interleaver and the receiver comprises a de-interleaver, the bit interleaver being designed according to the error correcting code structure to ensure that the performance at the output of the associated decoder exhibits the achievable target diversity order.

13. System according to claim 12, wherein the error correcting code is systematic and the bit interleaver places the systematic bits on the blocks of highest diversity order of the equivalent nested block channel.

14. Transmitter of a system for transmitting information data to a receiver over nested block channel, the transmitter comprising an encoder following an error correcting code structure, the receiver comprising a decoder defined according to the error correcting code structure, the nested block channel comprising a scaled BPSK binary modulator, the amplitude of which may vary from one bit transmission to the other,
wherein the coding rate (Rc) of the encoder or the parameters (D,L) of the nested block channel made of blocks are selected dependently one from each other to achieve a target diversity order of the system and to maximize the coding gain, and
wherein D represents the diversity orders of each block, and L represents the lengths of each block.

15. Transmitter according to claim 14, a mathematical model of the nested block channel consisting in a concatenation of the blocks, said nested block channel having two parameters which are a set of the diversity orders D={D(1), ..., D(k), ..., D(|D|)} and a set of the lengths of blocks L={L(1), ..., L(k), ..., L(|D|)}, where |D| is the cardinality of the set of the diversity orders D, the number of concatenated blocks being equal to |D| the fading random variable associated to the i-th block being defined by a combination of a subset S(i) of D(i) random variables with the integer value D(i)≦λ where λ is an integer number of independent fading distributions, such that S(i+1)⊂S(i), which means ∀i<j, D(i)≧D(j) and assuming that D(1)=λ has the highest diversity order,
wherein the coding rate (Rc) of the encoder, the two parameters (D, L) of the nested block channel and the achievable target diversity order δ of the system are linked by the relationship $$\delta = D(i) \text{ where } i \text{ is given by } \sum_{k=1}^{i-1} L(k) < Rc \sum_{k=1}^{|D|} L(k) \leq \sum_{k=1}^{i} L(k).$$

16. Transmitter according to claim 15, the nested block channel comprising a binary modulator the output of which are vectors of modulation symbols (zi), a partial linear combiner, a Sliding Triangular channel comprising M time slots and a detector,
wherein the modulation symbols (zi) of a same vector (Z) of modulation symbols are combined together by the linear combiner which provides an output vector (X) of M combined symbols (xi) associated to one transmission over the Sliding Triangular channel.

17. Transmitter according to claim 16, wherein the first combined symbols (x1) and last s−1 combined symbols (x(M+2−s), ..., x(M)) of said vector (X) of M combined symbols (xi) are linear combinations of the first s modulation symbols (zl, ..., zs) and each of the other combined symbols (xi) is equal to one of the last M−s modulation symbols (zi), s being the partial combining size of the linear combiner.

18. Transmitter according to claim 17, the equivalent nested block channel having parameters D={M,M−1 ..., s} and L={sN/M,N/M, ..., N/M},
wherein the coding rate (Rc) of the encoder, the number M of time slots of the Sliding Triangular channel and the partial combining size s of the linear combiner and the achievable target diversity order δ are selected dependently one from each other by the following relationship:

$$\delta = \min(s + \lfloor(1-Rc)M\rfloor, M).$$

19. Transmitter according to claim 18,
wherein the partial combining size s of the linear combiner is chosen according to the target diversity order δ, the coding rate (Rc) of the encoder and the number M of time slots of the Sliding Triangular channel, by the following relationship:

$$s = \arg\min_{s'}\{\delta = \min(s' + \lfloor(1-Rc)M\rfloor, M)\}.$$

20. Transmitter according to claim 16, the number M of time slots of the transmission protocol which define the Sliding Triangular channel is a multiple of the partial linear combining size s of the linear combiner,
wherein the first combined symbols (x1) and last s−1 symbols (x(M+2−s), ..., x(M)) are linear combinations of the first s modulation symbols (zl, ..., zs), the second combined symbol (x2) and last s−1 non-already considered combined symbols (x(M+3−2s), ..., x(M+1−s)) are linear combinations of the s following and non-already considered modulation symbols (z(s+1), ..., z(2s)), and so on.

21. Transmitter according to claim 20, the equivalent nested block channel having parameters D={M,M−1 ..., M+1−M/s} and L={sN/M, ..., sN/M}, wherein that the coding rate (Rc) of the encoder, the number M of time slots of the Sliding Triangular channel and the partial combining size s of the linear combiner and the achievable target diversity order δ are selected dependently one from each other by the following relationship:

$$\delta = \min\left(\frac{M(s-1)}{s} + 1 + \left\lfloor\frac{(1-Rc)M}{s}\right\rfloor, M\right).$$

22. Transmitter according to claim 21, wherein the partial combining size s of the linear combiner is chosen according to the target diversity order δ, the coding rate (Rc) of the encoder and the number M of time slots of the Sliding Triangular channel, by the following relationship:

$$s = \arg\min_{s'}\left\{\delta = \min\left(\frac{M(s'-1)}{s'} + 1 + \left\lfloor\frac{(1-Rc)M}{s'}\right\rfloor, M\right)\right\}.$$

23. Transmitter according to claim 14, wherein the transmitter comprises a bit interleaver and the receiver comprises a de-interleaver, the bit interleaver being designed according to the error correcting code structure in order to ensure that the performance at the output of the associated decoder exhibits the achievable target diversity order.

24. Transmitter according to claim 23, wherein the error correcting code is systematic and the bit interleaver places the systematic bits on the blocks of highest diversity order of the equivalent nested block channel.

* * * * *